(12) United States Patent
Burg

(10) Patent No.: US 11,255,554 B2
(45) Date of Patent: Feb. 22, 2022

(54) DEHUMIDIFYING AND ENERGY RECAPTURE SYSTEM

(71) Applicant: Desert Aire Corp., Germantown, WI (US)

(72) Inventor: Craig Burg, Sussex, WI (US)

(73) Assignee: Desert Aire Corp., Germantown, WI (US)

( * ) Notice: Subject to any disclaimer, the term of this patent is extended or adjusted under 35 U.S.C. 154(b) by 467 days.

(21) Appl. No.: 16/253,675

(22) Filed: Jan. 22, 2019

(65) Prior Publication Data

US 2019/0226694 A1 Jul. 25, 2019

Related U.S. Application Data

(60) Provisional application No. 62/620,143, filed on Jan. 22, 2018.

(51) Int. Cl.
| | | |
|---|---|---|
| *F24F 3/00* | (2006.01) | |
| *F24F 3/14* | (2006.01) | |
| *F24F 5/00* | (2006.01) | |
| *F24F 3/147* | (2006.01) | |

(52) U.S. Cl.
CPC ............ *F24F 3/1405* (2013.01); *F24F 3/147* (2013.01); *F24F 5/0071* (2013.01); *F24F 2003/1452* (2013.01)

(58) Field of Classification Search
CPC .......... F24F 5/0071; F24F 3/147; F24F 3/044; F24F 3/14; F24F 3/1405; F24F 2003/144; F24F 2003/1446; F24F 3/00; B60H 1/00021; B60H 1/00028; B60H 1/00064; B60H 1/00057; B60H 2001/00121; B60H 2001/00135; F25B 5/00; F25B 5/02; F25B 5/04

See application file for complete search history.

(56) References Cited

U.S. PATENT DOCUMENTS

| | | | |
|---|---|---|---|
| 4,517,810 A | 5/1985 | Foley et al. | |
| 5,333,470 A * | 8/1994 | Dinh | F24F 3/153 62/333 |
| 5,682,754 A * | 11/1997 | Groenewold | F24F 5/0071 236/49.3 |
| 8,347,640 B2 | 1/2013 | DeMonte et al. | |

* cited by examiner

*Primary Examiner* — Jianying C Atkisson
*Assistant Examiner* — Erik Mendoza-Wilkenfel
(74) *Attorney, Agent, or Firm* — Boyle Fredrickson S.C.

(57) ABSTRACT

A dehumidifying system includes an enclosure having at least one opening disposed at a first end and at least one opening disposed at a second end. A plurality of air paths that extend through the enclosure and are separated from one another by partitions along at least a portion of the enclosure. A dehumidifier evaporator is disposed within the enclosure and configured such that at least one of the air paths is disposed to flow through the dehumidifier evaporator. The dehumidifier evaporator includes a dehumidifying coil and a heat pipe assembly at least partially wrapping around the dehumidification coil.

15 Claims, 7 Drawing Sheets

DEHUMIDIFYING AND ENERGY RECAPTURE SYSTEM

CROSS REFERENCE TO RELATED APPLICATIONS

This application claims priority to U.S. Provisional Patent Application Ser. No. 62/620,143 titled "DEHUMIDIFYING AND ENERGY RECAPTURE SYSTEM" filed on Jan. 22, 2018 and the entire contents of which is expressly incorporated herein.

BACKGROUND OF THE INVENTION

The present invention is directed to an apparatus and method of more efficiently controlling temperature and humidity conditions associated with indoor water environments in a manner that is operative to dehumidify, heat, cool and refresh the air in a room. The present invention is particularly well suited to control the humidity and temperature conditions of indoor swimming or other high humidity environments such as natatoriums and water parks.

It is commonly understood that the humidity of the air associated with indoor swimming or water dependent operations, if left unaddressed, can often be excessive and harmful to the building structure as well as detrimental to the comfort of occupants of the room. The high humidity results from evaporation of water from the surface of the pool or other indoor water source. As is well known, evaporation results in a loss of heat energy from the pool and that energy inheres as sensible and latent heat in the vapor. In indoor swimming pool and water park environments, air conditioning units have been used for dehumidifying a return air from a swimming pool room by passing the air over an evaporator coil of a refrigeration system which drops the temperature of the air below the dew point, thereby precipitating at least a major part of the water out of the air after which the air is resupplied to the pool room.

Because indoor and outdoor air temperatures and humidity conditions vary over large ranges through the seasons it will be evident that a highly versatile control system would be necessary to keep the system balanced to maintain the proper air exchange frequency and the proper supply air temperature and humidity for maximum comfort of the occupants of the pool room and at the highest coefficient of performance or energy utilization efficiency that is possible.

Good energy conservation performance of a pool air and water conditioning system can only be obtained if the system can be easily and accurately balanced concurrently with completion of the installation of the system and if that balance is automatically maintained without attention during subsequent operations of the system. It is the usual practice to provide the system installation contractor with a manual containing instructions for balancing the system upon completion of the installation. However, experience has shown that the difficulty of obtaining proper balance with pre-existing system controllers and the patience it took to get a good result has resulted in systems going into use without ever having been properly balanced. One contribution to resolving the problem of balancing the input and output air in the unit and maintaining balance during long periods of operation resides in providing a control system that makes it easy, even for one who is unskilled in doing this kind of work, to balance the conditioning system quickly and optimally.

Various systems and methods have been provided in an effort to mitigate user interference with balanced operation of such environment dehumidifying control equipment. One such approach is disclosed in Applicant's prior U.S. Pat. No. 5,682,754 which discloses a distinguished control arrangement wherein (1) by exhausting to the outside atmosphere, when the system is in the room air cooling mode, a significant fraction of the hottest or highest energy return air before the remainder of the return air is passed through the evaporator cooling coil for heat removal, and (2) by exhausting to the atmosphere, when the system is in the room air heating mode, a significant fraction of the coldest or lowest energy return air after its heat is extracted by an evaporator cooling coil so an ensuing reheating condenser coil over which the remainder of the return air and makeup air mixture passes will be able to reheat the air with heat derived from refrigerant that has been heated in a heat pump mode when the return air was passing over the evaporator cooling coil.

Unfortunately, such approaches are not without their respective shortcomings. Although the system disclosed therein provides improved balancing of the heating, cooling, and dehumidification of the target environment, it is desired to provide an environment temperature and dehumidification system that more efficiently utilizes environment and fluid flow latent conditions to achieve the desired manipulations of the humidity and/or temperature of the environment with a construction and methodology that is more responsive to contemporaneous conditions associated with the natatorium environment. That is, it is desired to provide an environment humidity and temperature control system that can be uniquely tailored to specific conditions associated with implementation of the system as well as providing sustained balanced operation of the resultant system wherein the balanced operating condition is more uniquely configured to the instantaneous conditions.

Therefore, there is a need for a humidity and temperature environment control arrangement, assembly, and method of operation associated with indoor swimming, waterpark, or natatorium environments that allows more efficient utilization of latent energy and environment use conditions to provide balanced conditioning of the pool and surrounding environments.

BRIEF DESCRIPTION OF THE INVENTION

The present invention relates to a dehumidifying system and method of operation that overcomes one or more of the drawbacks disclosed above. The dehumidification system as disclosed herein is configured to provide increased performance and operating efficiency over other known dehumidifying systems.

In accordance with one aspect of the application, a dehumidifying system includes an enclosure having at least one opening disposed at a first end and at least one opening disposed at a second end, a plurality of air paths extend through the enclosure and are fluidly separated from one another by partitions along at least a portion of the enclosure. A dehumidifier evaporator is disposed within the enclosure and is in thermal communication with an air flow associated with at least one of the air paths. The dehumidifier evaporator includes a dehumidifying coil and a heat pipe assembly that at least partially wraps around the dehumidification coil. The heat pipe assembly can be configured to effectuate thermal exchange with the air flow directed over the dehumidifying coil both before the air flow impinges upon the coil and after the air flow has traversed the coil.

According to another aspect of the application, the heat pipe assembly includes a first heat pipe disposed on a first side of the dehumidification coil and, spaced apart therefrom, a second heat pipe is disposed on a second side of the dehumidification coil and spaced apart therefrom, and a plurality of bypass passages extend between the first and second heat pipes adjacent to at least one edge of the dehumidifying coil.

According to yet another aspect of the application, the system may also include a recovery evaporator disposed within the enclosure. At least one of the air paths is disposed to flow through the recovery evaporator, and the recovery evaporator removes energy from the air flowing therethrough such that energy associated with discharge air flows can be recaptured and directed to other desired aspects of the environment, such as the water flows associated with the natatorium environment.

These and other aspects, features, and objects of the present application will be better appreciated and understood when considered in conjunction with the following description and the accompanying drawings. It should be understood, however, that the following description, while indicating preferred embodiments of the present invention, is given by way of illustration and example and not of limitation. Many changes and modifications may be made within the scope of the present invention without departing from the spirit thereof, and the invention includes all such modifications.

BRIEF DESCRIPTION OF THE FIGURES

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings.

Figure 1:
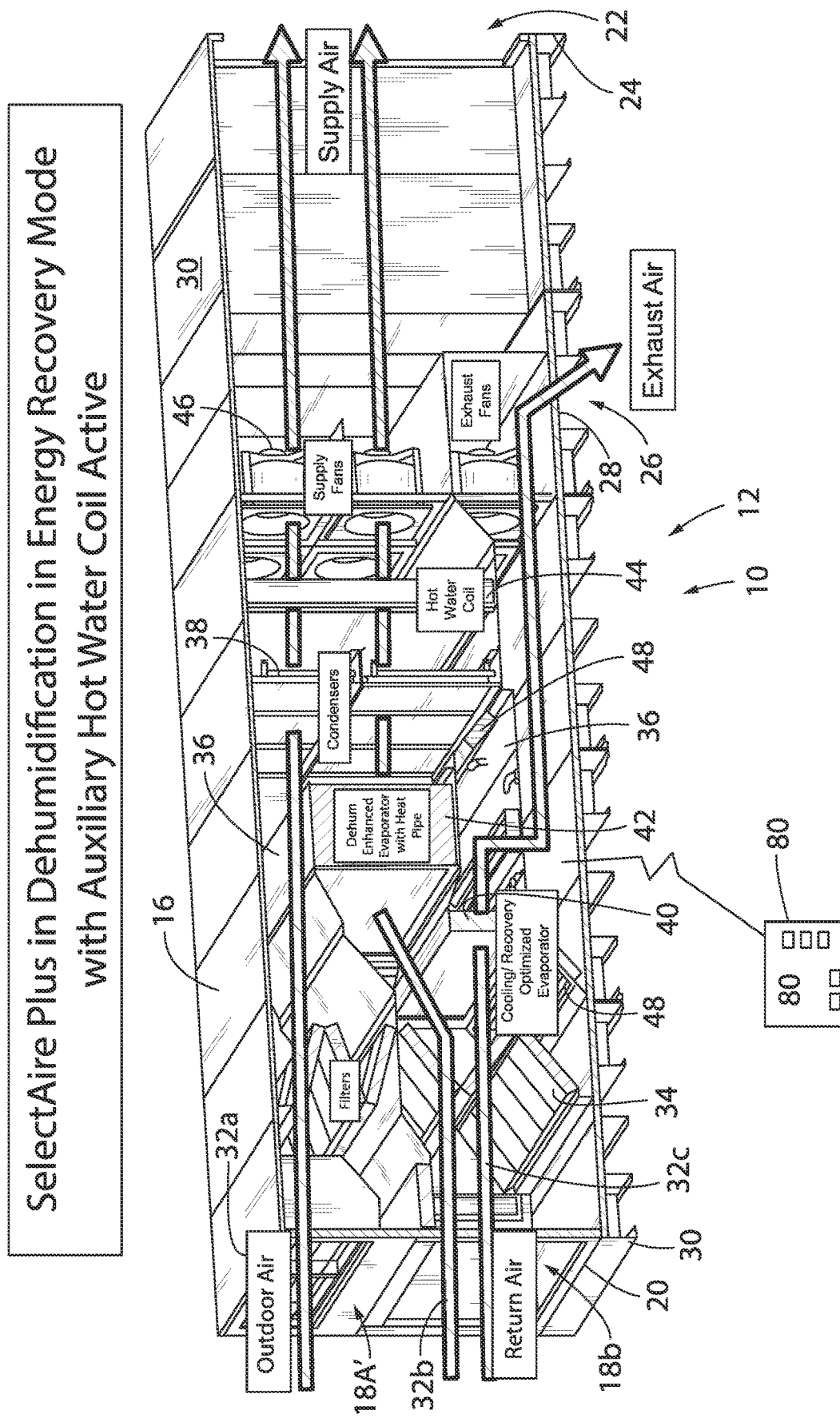
FIG. 1 is a perspective view of a dehumidifying system in a first mode, according to the present application.

In describing the preferred embodiments of the invention, which are illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION OF THE FIGURES

The present invention and the various features and advantageous details thereof are explained more fully below with reference to the non-limiting embodiments described in detail in the following description. The method of humidity control and energy recapture is detailed in order for those skilled in the art to practice the invention with each of the various conditioning systems disclosed herein. The method, apparatus, and alternate embodiments disclosed herein exemplify the preferred embodiments of the invention. It is appreciated that the method and apparatus may be changed from that which is shown in the drawings without departing from the scope of the invention, which is defined by the claims.

Figure 2:
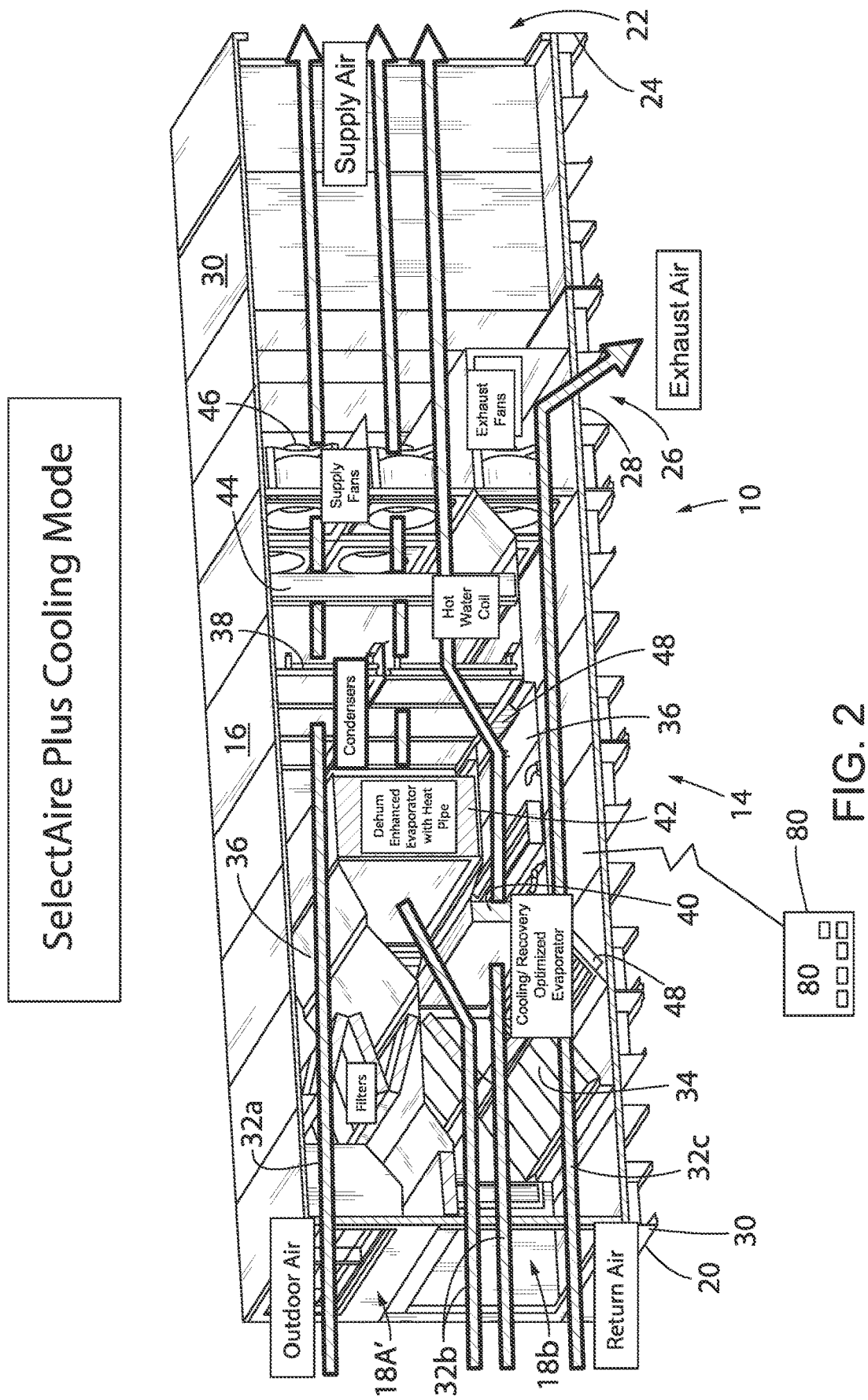
FIG. 2 is a perspective view of the dehumidifying system in a second mode, according to the present application.
Figure 8:
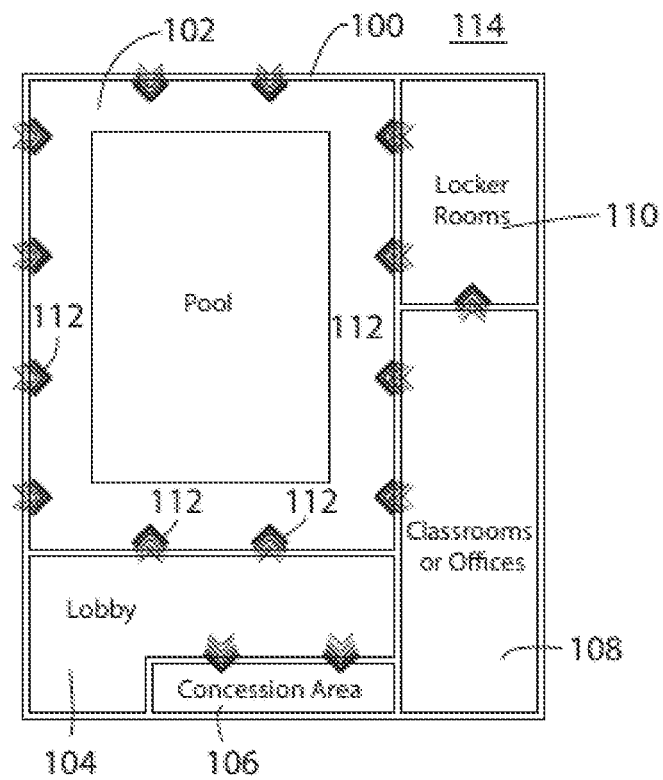
FIG. 8 is a graphic representation of an exemplary environment associated with use of the dehumidifying system shown in FIGS. 1 and 2.

Referring first to FIGS. 1, 2, and 8, perspective views of a dehumidifying system 10 in a first mode 12 and a second mode 14, respectively, are shown. The dehumidifying system 10 is configured to control the temperature and humidity in a building 100 (FIG. 8), such as, but not limited to, a water park, a swimming pool or natatorium environment 102 (FIG. 8). Referring back to FIGS. 1 and 2, the system 10 includes an enclosure 16 that generally surrounds the components of the system 10 and defines one or more air flow paths therethrough as disclosed further below. At least one intake opening 18 is disposed at a first end 20 of the enclosure 16 to provide an air intake. In the representative embodiment of the invention, the at least one opening 18 includes an atmospheric or outdoor air opening 18a and a treated environment return air opening 18b. At least one output opening 22 is disposed at a second end 24 of the enclosure 16 to provide an air output, such as the supply air outputted to the building 100 (FIG. 8).

It is appreciated that conditioning the atmosphere associated with the natatorium 102 may result in conditioning or exchange of air flows relative to other portions of building 100, such lobby areas 104, concession areas 106, discrete rooms or offices 108 and/or locker rooms spaces 110, wherein the atmospheric portions thereof are fluidly connected to the atmosphere of the natatorium 102. Such an understanding is represented in FIG. 8 by the various discrete air flow arrows 112. Regardless of the target environment and referring back to FIGS. 1 and 2, the enclosure 16 may further include at least one exhaust opening 26 disposed at a location 28 between the first and second ends 20, 24 of the enclosure 16 or at the second end 24 of the enclosure 16. The operation and benefits of the exhaust opening 26 is described in greater detail further below.

In the representative embodiment of the invention, the exterior parts 30 of the enclosure 16 may be formed from various materials such as, but not limited to, aluminum or a galvanized or galvannealed steel. In addition, each exterior part 30 may be powder coat finished to resist corrosion. The exterior parts 30 of the enclosure 16 are preferably configured to meet a minimum corrosion resistance specification of 1,000 hours of salt spray.

The enclosure 16 may include a number of service doors (not shown) disposed at various locations along the length of the enclosure 16. For example, a service door may be disposed at all of the regular maintenance and inspection points for access to the components within the enclosure 16. A double bypass seal (not shown) is preferably disposed at each service door for weather resistance and to maintain a desired seal against static pressures between the internal cavities defined by enclosure 16 and the atmosphere defined by building 100 (FIG. 8) and the surrounding ambient atmosphere 114.

Figure 10:
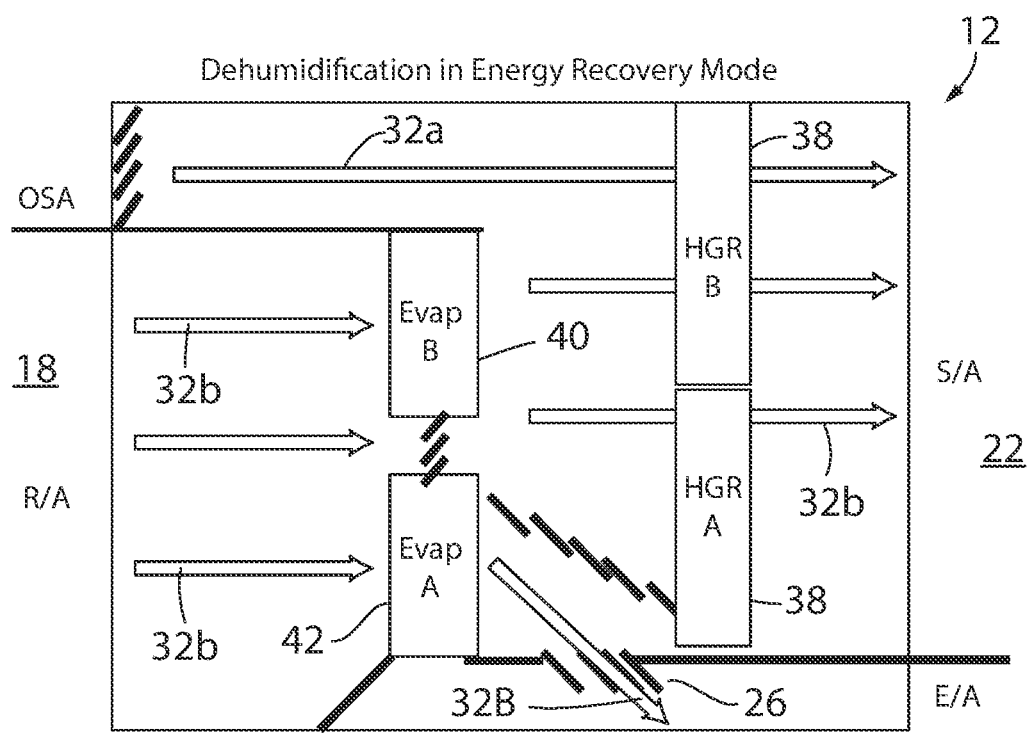
FIG. 10 is a graphic representation of the conditioning system shown in FIG. 1 operating in a dehumidification and energy recovery mode of operation.

Referring still to FIGS. 1 and 2, the system 10 may include a number of air paths 32 separated by partitions 36. In the representative embodiment of the invention depicted in FIGS. 1 and 10, three (3) air paths 32a, 32b, 32c, are shown when the system 10 is configured for operation in a first mode 12 to heat and dehumidify the air flow associated with the treated environment.

The first air path 32a enters the enclosures 16 through the outdoor air opening 18a. The first air path 32a then proceeds through an array of filters 34 disposed adjacent the first end 20 of the enclosure 16. One or more partitions 36 are disposed within the enclosure 36 to direct the first air path 32a toward the condensers 38, while bypassing a recovery evaporator 40 and a dehumidifier evaporator 42. In the first operating mode 12, the air is warmed as it passes through the condensers 38. The first air path 32a then proceeds to a hot water coil 44 before proceeding to supply air opening 22. In the first operating mode 12, the hot water coil 44 is activated so as to heat the air as it passes through the hot water coil 44. In the representative embodiment of the invention, an array of fans 46 is disposed between the hot water coil 44 and the supply air opening 22 and include backwards-inclined airfoil blades so as to maintain negative static pressure within the enclosure 32 as compared to the external environments of the outdoors 114 and the building 100.

The second air path 32b enters the enclosure 16 through the return air opening 18b and then proceeds through the array of filters 34 disposed adjacent the first end 20 of the enclosure 16. The second air path 32b then proceeds above the recovery evaporator 40 and to the dehumidifier evaporator 42. In the first operating mode 12, the air is cooled and moisture is removed as it passes through the dehumidifier evaporator 42, which is disclosed further below with respect to FIG. 3. The second air path 32b then proceeds through the condensers 38, where the air is warmed as it passes through the condensers 38, and to the hot water coil 44, where the air is warmed as it passes through the active hot water coil 44. The second air path 32a then proceeds to the supply air opening 22 where the air is supplied to the treated environment such as the enclosure 102 of a building 100 or the like.

The third air path 32c enters the enclosure 16 through the return air opening 18b and then proceeds through the array of filters 34 disposed adjacent the first end 20 of the enclosure 16. In the first mode 12 of operation of the system 10, the third air path 32c proceeds to the recovery evaporator 40. The air is cooled and may or may not be dehumidified as it passes through the recovery evaporator 40. The third air path 32c then bypasses the above described elements of the system 10 and proceeds to the exhaust opening 26. In other embodiments of the invention, a portion of the third air path 32c may proceed below the recovery evaporator 40 and toward the exhaust opening 26. As such, the recovery evaporator 40 works to recover energy from the air flow directed to the exhaust opening 26.

As a result of the first operating mode 12 describe above, the first and second air paths 32a, 32b proceed from the intake openings 18 to the output opening 22. Air from the return air opening 18b may proceed through the dehumidifier evaporator 42 to remove moisture from the air. Air from both the outdoor air opening 18a and the return air opening 18b is warmed as it passes through the condensers 38 and the active hot water coil 44. As a result, the system 10 removes moisture from the air and warms the air provided to the building through the supply air opening 22. In addition, the recovery evaporation 40 removes heat energy from the air directed toward and prior to passage of the discharge air flow through the exhaust opening 26.

Figure 9:
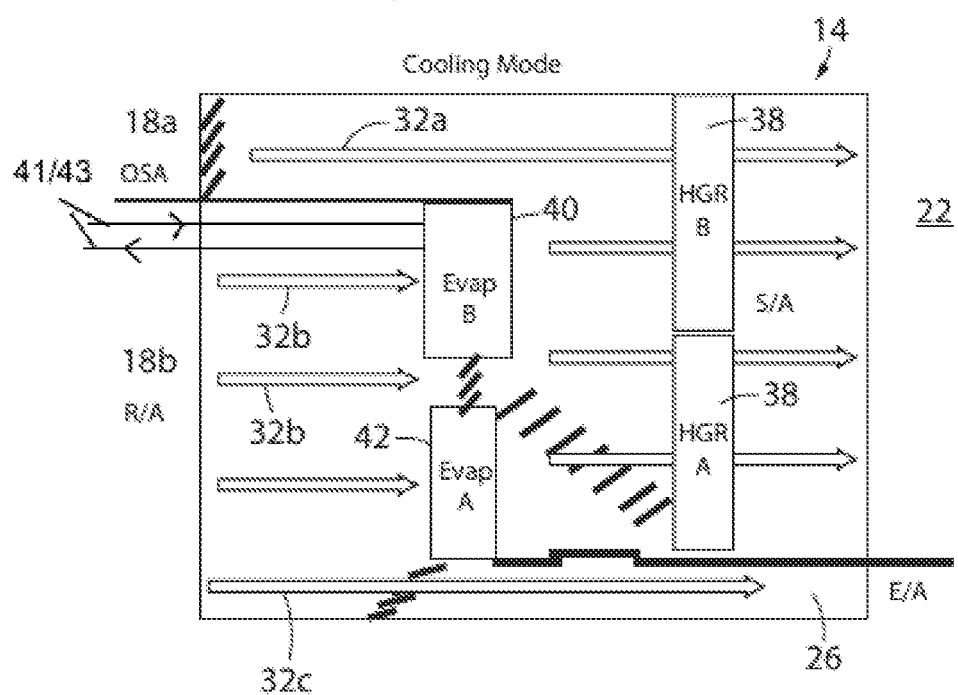
FIG. 9 is a graphic representation of the conditioning system operating in a cooling mode.

FIGS. 2 and 9 illustrate system 10 operating in the second operating mode 14 to cool and dehumidify the air. The first air path 32a proceeds through the outdoor air opening 18a and the array of filters 34 disposed adjacent the first end 20 of the enclosure 16. The partition 36 directs the first air path 32a to the condensers 38 and the hot water coil 44. When in the second operating mode 14, the air passes through the condensers 38 and the hot water coil 44 without being warmed. The first air path 32a then proceeds to the supply air opening 22.

The second air path 32b enters the enclosure 16 through the return air opening 18b and then proceeds through the array of filters 34 disposed adjacent the first end 20 of the enclosure 16. The second air path 32b then proceeds through the recovery evaporator 40 or above the recovery evaporator 40 and to the dehumidifier evaporator 42. Air that passes through the recovery evaporator 40 is cooled as energy is recovered from the air by the recovery evaporator 40. Air that passes through the dehumidifier evaporator is cooled and dehumidified, the process of which is described further below with respect to FIG. 3. The second air path 32b then proceeds through the condensers 38, where the air is warmed as it passes through the condensers 38 and to the hot water coil 44, where it passes through the condensers 38 and hot water coil 44 without being warmed. The second air path 32a then proceeds to the supply air opening 22 where the air is supplied or directed to the treated environment or space 102 associated with a building 100 or the like.

The third air path 32c enters the enclosure 16 through the return air opening 18b and proceeds through the array of filters 34 before being directed below the recovery evaporator 40 through a damper 48 disposed in the partition 36. The third air path 32c is then directed to the exhaust opening 26.

As a result of the second operating mode 14 describe above, the first and second air paths 32a, 32b proceed from the intake openings 18 to the output opening 22. Air from the return air opening 18b may proceed through either the recovery evaporator 40 or the dehumidifier evaporator 42 to cool and remove moisture from the air. In addition, a portion of the air from the return air opening 18b may also be sent directly to the exhaust opening 26. As a result, the system 10 removes moisture from the air and cools the air provided to the building 100 through the supply air opening 22.

It is contemplated that the energy recovered by the recovery evaporator 40 associated with heat energy removed from the air flow may be incorporated into either the supply air 41 or a water source 43 within the building, such as a pool or natatorium.

System 10 is also configured to monitor the outdoor air flow rate, exhaust flow rate, static pressure, temperature, and humidity to operate elements of the system 10 to maintain a negative pressure within the enclosure 16 and keep ideal humidity and temperature within the building. For example, the system 10 may be controlled by a microprocessor-based controller 80 (FIGS. 1 and 2) that is operationally connected to one or more valves, compressors, fans, pressure sensors, actuators or the like to effectuate the desired flow of fluid and air flows through system 10 to achieve the desired cooling or dehumidification associated with operating modes 12, 14 of system 10. It should be appreciated that controller 80 can be disposed proximate enclosure 16 when system 10 is conveniently accessible or may be conveniently remotely located relative to enclosure 16 to allow more expedient user interaction therewith and/or assessment thereof. In some embodiments of the invention, the system 10 may further include a user interface to display information regarding the system 10, including diagnostic readouts, operating mode, etc., and provide alarms. It is also contemplated that the system 10 and/or controller 80 may be connected to a more robust building or building environment automation and communication systems including wireless communication and interaction systems such as Bluetooth connectivity or the like.

Figure 3:
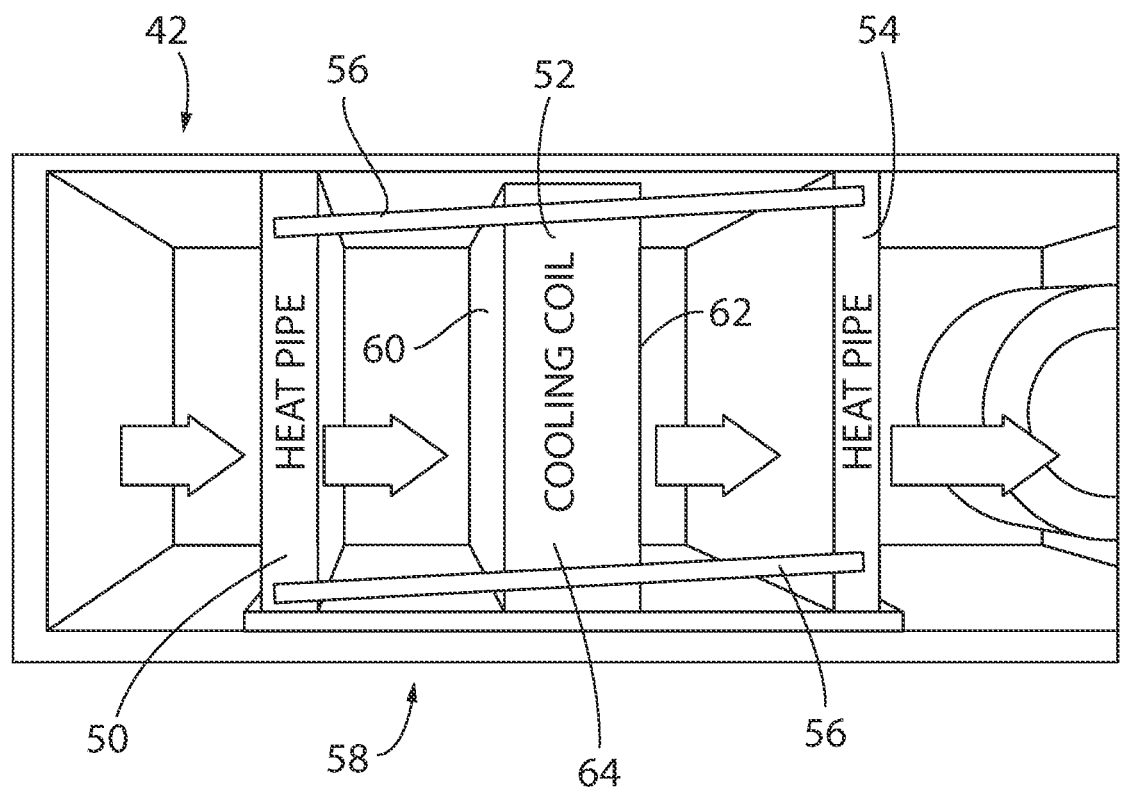
FIG. 3 is a schematic representation of an evaporator of the dehumidifying system.

FIG. 3 illustrates one embodiment of the dehumidifier evaporator 42 as disclosed above which provides more efficient removal of humidity from the air passing through the dehumidifier evaporator 42. The dehumidifying evaporator 42 includes a first heat pipe 50, a dehumidifying coil 52, and a second heat pipe 54. The first and second heat pipes 50, 54 are preferably fluidly connected to one another by a plurality of bypasses 56 to form a heat pipe assembly 58. The first heat pipe 50 is disposed on a first side 60 of the dehumidifying coil 52 and spaced apart therefrom, while the second heat pipe 54 is disposed on a second side 62 of the dehumidifying coil 52 and spaced apart therefrom. The bypasses extends between the first and second heat pipes 50, 54 adjacent at least one edge 64 of the dehumidifying coil to partially or wholly wrap the heat pipe assembly 58 around the dehumidifying coil 52. The configuration of the heat pipe assembly 56 tempers the air as it leaves the dehumidifying coil 52 to minimize temperature fluctuations in the air.

In the representative embodiment of the invention, when air passes over the first heat pipe 50, a refrigerant within the heat pipe vaporizes and transmits heat from the air to the second heat pipe 54. As a result, some heat is removed from the air flow after passing over the first heat pipe 50 and before the air flow passes over the dehumidifying coil 52. As shown in FIG. 3, this section of the dehumidifier evaporator 42 is designated as a pre-cooled section.

When air passes over the dehumidifying coil 52 additional heat is transferred from the air flow, which results in the air coming closer to saturation and resulting in greater condensate removal by the dehumidifying coil 52. As shown in FIG. 3, the section of the dehumidifier evaporator 42 between the dehumidifying coil 52 and the second heat pipe 54 is designated as the over cooled section.

The air flow is then passed over the second heat pipe 54 in order to reheat the air by way of the heat transferred from the first heat pipe 50 to the second heat pipe 54, as described above. This entire process of pre-cooling and reheating the air is accomplished with very little additional or system extraneous sourced energy as the heat energy used is transferred between the first and second heat pipes 50, 54. Because some heat has been removed from the air before encountering the evaporator coil, the incoming air stream section can be referred to as a "pre-cool heat pipe". The dehumidifier evaporator 42 described above is approximately 25% more efficient than traditional pool environment or natatorium dehumidifiers. Implementation of the dehumidifier evaporator assembly disclosed above directs that portion of the air flow that is directed to evaporator 42 across the heat pipe assembly 50, 54 both prior to and after the air flow interaction with the dehumidifying coil 52. When warm air passes over the heat pipe assembly 50, 54, the refrigerant within the heat pipe vaporizes, carrying heat to the second section of heat pipe assembly placed downstream.

Air entering the evaporator coil is assisted to a lower temperature, therefore coming closer to saturation and resulting in greater condensate removal by the dehumidification coil. The "over-cooled" air is then reheated to a desirable temperature by the reheat heat pipe section, using the heat transferred from the pre-cool heat pipe. This entire process of pre-cool and reheat is accomplished with very little demand for additional external system energy.

Figure 4:
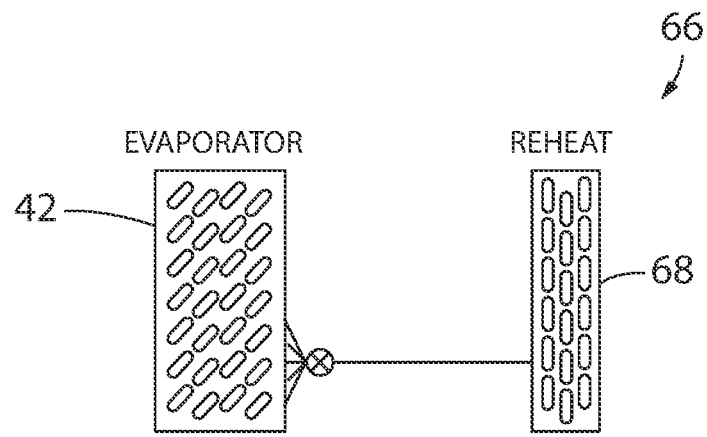
FIG. 4 is a schematic representation of a first modular embodiment of the evaporator.

Now referring to FIGS. 4-7, the system 10 may include a variety of modular design options to enhance its performance and efficiency and to facilitate customization of system 10 for specific dehumidification or environment treatment applications. FIG. 4 illustrates a first modular design 66 similar to that describe above, wherein after moisture has been removed from the air by way of the dehumidifier evaporator 42, the air is reheated by a reheating coil 68, such as the condensers 38 or hot water coil 44 shown in FIGS. 1 and 2.

Figure 5:
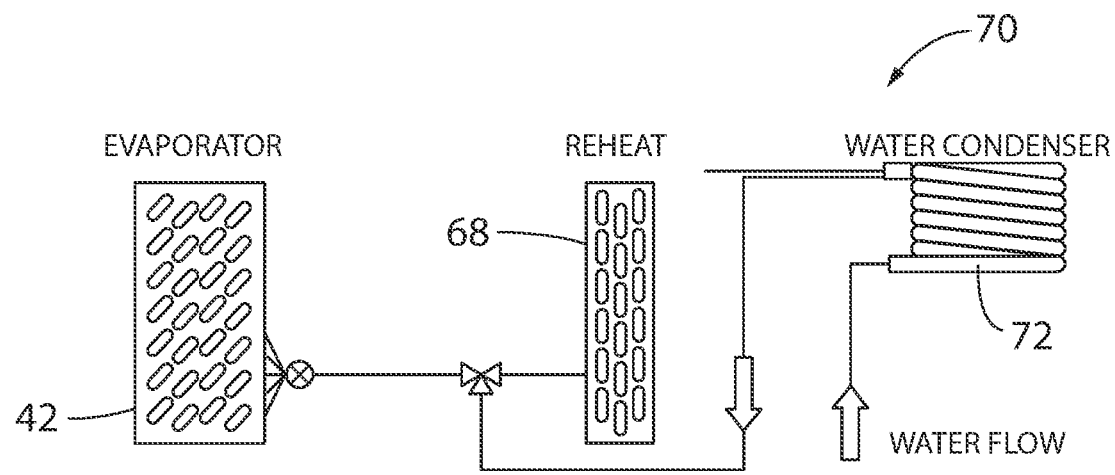
FIG. 5 is a schematic representation of a second modular embodiment of the evaporator.

FIG. 5 illustrates a second modular design 70 in which a water condensing coil 72 is added in addition to the reheating coil 68. Depending on the operational needs of the system, either the water condensing coil 72 or the reheating coil 68 may be the primary heat sink. As such, the latent heat of the system may be directed to a water source by way of the water condensing coil 72 or returned to the air by way of the reheating coil 68.

Figure 6:
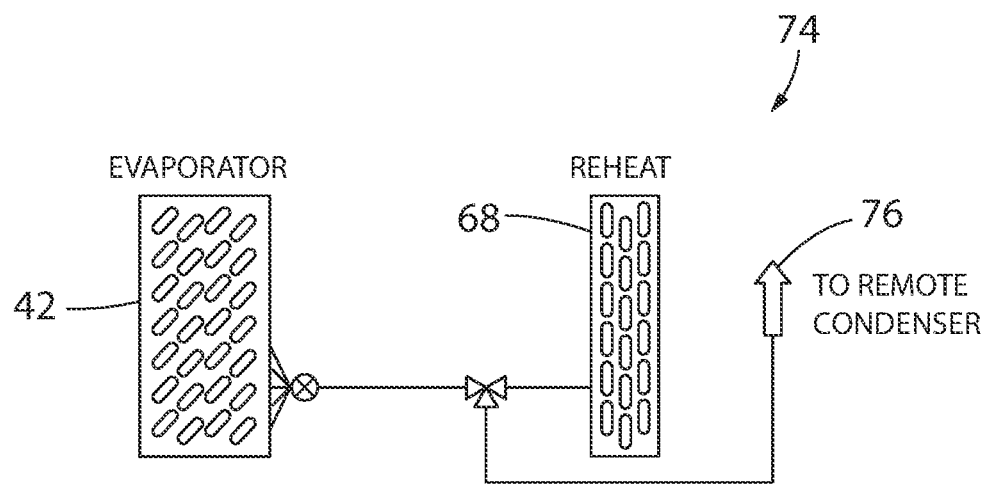
FIG. 6 is a schematic representation of a third modular embodiment of the evaporator.

FIG. 6 depicts a third modular design 74 having a reheating coil 68 and an air-cooled remote condenser 76. As such, the latent heat of the system may be directed to the treated air flow by way of the reheating coil 68 or to the remote condenser 68.

Figure 7:
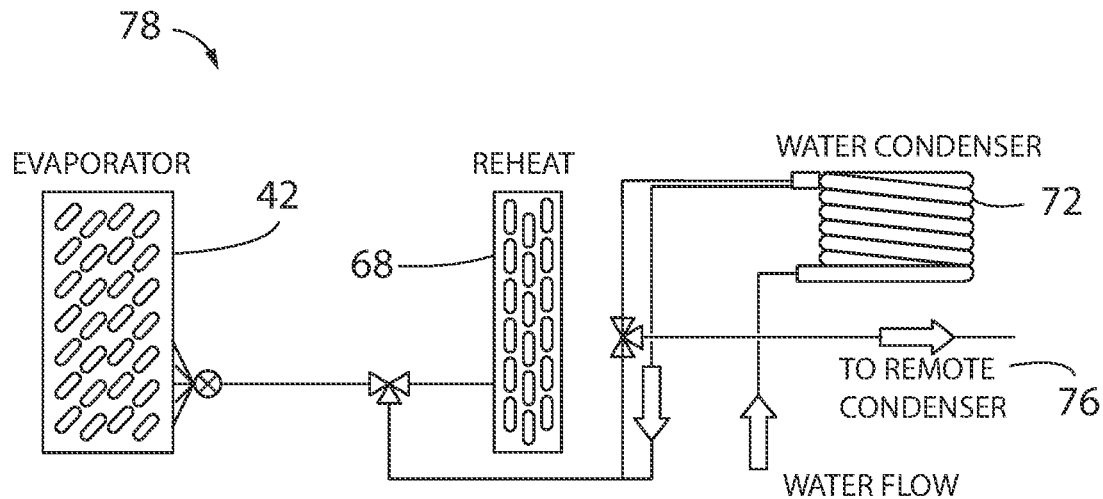
FIG. 7 is a schematic representation of a fourth modular embodiment of the evaporator.

FIG. 7 illustrates a fourth modular design 78 in which the reheating coil 68, the water condensing coil 72, and the air-cooled remote air condenser 76 are all used. It is contemplated that the fourth modular design 78 may be beneficial when only a partial water heatsink is available but full capacity dehumidification is required continuously, regardless of season. The various modules disclosed above allow system 10 to be uniquely configured to a variety of applications and a variety of applications wherein the ambient conditions, the use requirements and demands, the energy consumption, and thermal performance of the underlying system can be selected to satisfy anticipated and/or expected demands associated with integration of the system with a range of underlying natatorium conditions. That is, system 10 provides complete humidity control solutions for large indoor pool, natatorium applications, and water parks. The wrap-around construction of the heat pipe assembly relative to the dehumidification coil enhances the moisture removal capacity and efficiency of system 10 with more dehumidification being achieved with less external energy consumption as compared to previously deployed systems.

The enhanced dehumidification performance associated with the multi-portion or split heat pipe configuration and dehumidification coil of system 10 allows system 10 to recover more of the energy associated with the exhaust air flow than prior known systems. Preferably, each configuration of system 10 includes one or more backwards inclined air foil plenum fans for both supply and exhaust air flow streams and whose streams or flows are matched to the specific airflow and static pressure associated with the highest available operating efficiency. Preferably, all fans include electronically commutated (EC) motors or AC motors with variable speed drives in a fan-wall configuration. In a preferred embodiment, system 10 includes a 2" double wall injected foam cabinet or enclosure with hinged access doors that ensure fluid flow sealing performance against even high static pressure fluid flows. Such considerations also facilitate serviceability of system 10. Whether intended for indoor or outdoor implementation, system 10 can be provided in single, or multiple piece designs for large units, thereby facilitating expedient installation and service of system 10.

The improved efficiency associated with implementation of dehumidification system 42 is considerable since most pool environments are configured to include dehumidification systems that operate at a non-variable frequency and have the majority of the operating hours associated with inactive pool environments whose conditions could be adequately controlled with often times less than half of the total capacity of the respective dehumidifier systems. Additionally, cold, dry winter air also reduces the capacity of occupied active pools during much of the year. Thus a dehumidifier system that maximizes its moisture removal efficiency for the majority of operating hours will yield the lowest operating cost system. The dehumidification system 42 associated with system 10 will be overall approximately 25% more efficient as compared to a traditional natatorium dehumidification system.

Therefore, a dehumidifying system according to one aspect to the present invention includes an enclosure having at least one opening disposed at a first end and at least one opening disposed at a second end. A plurality of air paths that are separated by partitions are defined along at least a portion of the enclosure. A dehumidifier evaporator is disposed within the enclosure and at least one of the air flows associated with a respective one of the air paths is disposed to flow through a dehumidifier evaporator. The dehumidifier evaporator is defined by a dehumidifying coil and a heat pipe assembly that at least partially wraps around the dehumidification coil.

Another aspect of the present application that is useable or combinable with one or more of the above features or aspects discloses a dehumidifying system that includes an enclosure that defines an air flow inlet at a first end of the enclosure and an air flow outlet at a second end of the enclosure. At least one partition is formed along at least a portion of the enclosure and oriented to define more than one air path associated with the air flow along at least a portion of the enclosure. A dehumidifier evaporator is disposed within the enclosure and is defined by a dehumidifying coil and a heat pipe assembly that is disposed about at least a portion of the dehumidifying coil. The dehumidifier evaporator is disposed within the enclosure and positioned relative to the at least one partition so that the air flow associated with at least one of the air paths is directed through a dehumidifier evaporator.

A further aspect of the present application discloses a method of forming a dehumidifier system that is usable or combinable with one or more of the aspects or features disclosed above. The method includes providing an enclosure that defines an air flow inlet and an air flow outlet. A partition is disposed in the enclosure and acts to define more than one air flow path between the air flow inlet and the air flow outlet defined by the enclosure. A dehumidifier evaporator that is defined by a dehumidifying coil and a heat pipe assembly is disposed in enclosure. The heat pipe assembly is disposed about at least a portion of the dehumidifying coil in at least one of the air flow paths. The dehumidifying coil and the heat pipe assembly are oriented such that an air flow directed toward the dehumidifying coil passes over the heat pipe assembly both prior to passing over the dehumidifying coil and after passing over the dehumidifying coil.

It should be understood that the above description, while indicating representative embodiments of the present invention, is given by way of illustration and not of limitation. Many changes and modifications may be made within the scope of the present invention without departing from the spirit thereof, and the invention includes all such modifications. Various additions, modifications, and rearrangements are contemplated as being within the scope of the following claims, which particularly point out and distinctly claim the subject matter regarding as the invention, and it is intended that the following claims cover all such additions, modifications, and rearrangements.

What is claimed is:

1. A dehumidifying system comprising:
    an enclosure having at least one opening disposed at a first end and at least one opening disposed at a second end;
    a plurality of air paths separated by partitions along at least a portion of the enclosure;
    a dehumidifier evaporator disposed within the enclosure, wherein at least one of the air paths is disposed to flow through the dehumidifier evaporator, the dehumidifier evaporator comprising:
        a dehumidifying coil; and
        a heat pipe assembly at least partially wrapping around the dehumidifying coil;
    a recovery evaporator disposed within the enclosure, wherein at least one of the air paths of the multiple air paths is disposed to flow through the recovery evaporator, and wherein the recovery evaporator removes energy from the air flowing through the recovery evaporator; and
    wherein the recovery evaporator transfers the energy from the air flowing through the recovery evaporator to at least one of a water source and an air flow separate from an air flow directed through the recovery evaporator.

2. The dehumidifying system of claim 1 wherein the heat pipe assembly comprises:
    a first heat pipe disposed on a first side of the dehumidification coil and spaced apart from the dehumidification coil;
    a second heat pipe disposed on a second side of the dehumidification coil and spaced apart from the dehumidification coil; and
    a plurality of bypass passages extending between the first and second heat pipes adjacent at least one edge of the dehumidifying coil.

3. The dehumidifying system of claim 2 wherein first heat pipe cools air passing over the first heat pipe, wherein the dehumidification coil cools the air passing through the dehumidification coil, and wherein the second heat pipe warms the air passing over the second heat pipe.

4. The dehumidifying system of claim 1 wherein at least one of the plurality of air paths is fluidly connected to an indoor swimming pool environment.

5. A dehumidifying system comprising:
    an enclosure that defines an air flow inlet at a first end of the enclosure and an air flow outlet at a second end of the enclosure;
    at least one partition formed along at least a portion of the enclosure and oriented to define more than one air path associated with an air flow along at least a portion of the enclosure; and
    a dehumidifier evaporator disposed within the enclosure and defined by a dehumidifying coil and a heat pipe assembly disposed about at least a portion of the dehumidifying coil, the dehumidifier evaporator being disposed within the enclosure and positioned relative to the at least one partition so that the air flow along at least a portion of the enclosure is directed through the dehumidifier evaporator;

a recovery evaporator disposed within the enclosure, wherein at least one of the more than one air paths is disposed to flow through the recovery evaporator so that the recovery evaporator removes energy from air flowing through the recovery evaporator to at least one of a water source and an air flow separate from the air flow directed through the recovery evaporator insert; and a control arrangement configured to communicate compressor waste heat energy to the air flow during a heating mode operating condition and direct a portion of the air flow through the dehumidifier coil during a cooling mode operating condition.

6. The dehumidifying system of claim 5 further comprising at least one filter associated with at least one of the air paths of the more than one air paths.

7. The dehumidifying system of claim 5 further comprising at least one fan disposed within the enclosure and oriented to generate the air flow.

8. The dehumidifying system of claim 7 further comprising an indoor swimming pool environment fluidly connected to the air flow inlet of the enclosure.

9. The dehumidifying system of claim 5 wherein the control arrangement is configured to communicate heat absorbed by the cooling coil during the cooling mode operating condition to at least one of water to the water source of a pool associated with the indoor swimming pool environment and an outdoor condenser.

10. The dehumidifying system of claim 5 wherein the control arrangement is configured to control static pressure of an environment being treated during switching of operation of the dehumidifying system between the heating mode operating condition and the cooling mode operating condition.

11. The dehumidifying system of claim 5 wherein the at least one partition provides at least an initial separation between an indoor air flow and an outdoor air flow directed into the enclosure.

12. A method of forming a dehumidifier system, the method comprising:

providing an enclosure that defines an air flow inlet and an air flow outlet;

disposing a partition in the enclosure to define more than one air flow path between the air flow inlet and the air flow outlet; and disposing a dehumidifier evaporator that is defined by a dehumidifying coil and a heat pipe assembly that is disposed about at least a portion of the dehumidifying coil in at least one of the air flow paths, the dehumidifying coil and the heat pipe assembly being oriented such that an air flow directed toward the dehumidifying coil passes over the heat pipe assembly both prior to passing over the dehumidifying coil and after passing over the dehumidifying coil; and disposing a recovery evaporator within the enclosure in another of the at least one of the air flow paths between the air flow inlet and the air flow outlet such that the another of the at least one of the air flow paths passes through the recovery evaporator and removes energy from air flowing through the recovery evaporator; and providing a control arrangement configured to control operation of the dehumidifier system to communicate compressor waste heat energy directed through the recovery evaporator to another of the at least one of the air flow paths during a heating mode operating condition and directing a portion of the air flow through the dehumidifying evaporator during a cooling mode operating condition and communicate heat absorbed by the dehumidifying evaporator during the cooling mode operating condition to at least one of water of a natatorium associated with the indoor swimming pool environment and an outdoor condenser.

13. The method of claim 12 further comprising connecting a first portion of the air flow inlet to an environment associated with a natatorium and a second portion of the air flow inlet to ambient atmosphere.

14. The method of claim 13 further comprising disposing at least one fan in the enclosure and orienting the fan to effectuate communication of an air flow from an environment of the natatorium, through the enclosure and the dehumidifier evaporator, and back to the environment of the natatorium.

15. The method of claim 13 further comprising connecting at least a portion of the air flow outlet to the environment associated with the natatorium.

* * * * *